P. MUELLER.
AUTOMATIC FIRE HOSE VALVE.
APPLICATION FILED NOV. 18, 1911.
1,026,994.
Patented May 21, 1912.
2 SHEETS—SHEET 1.
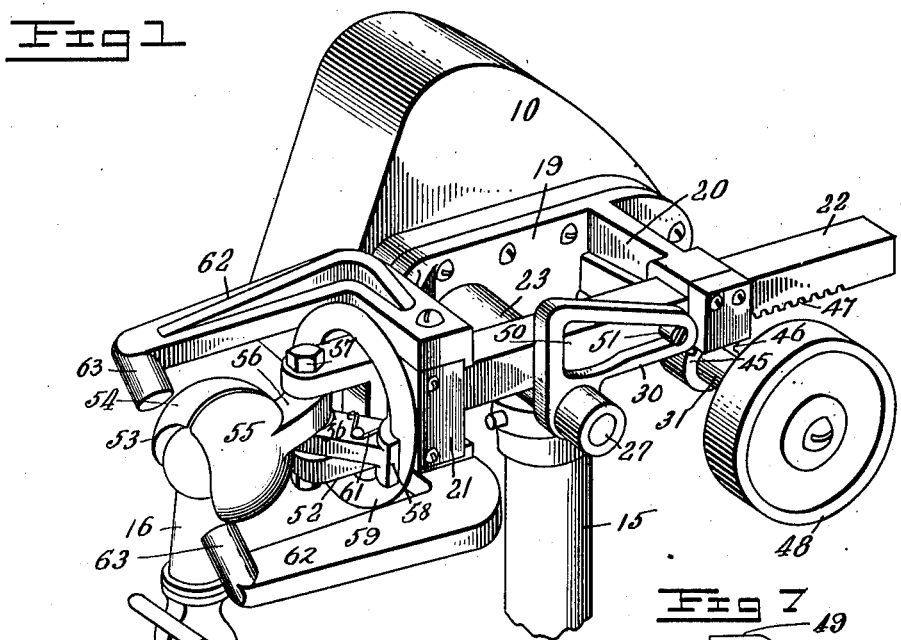
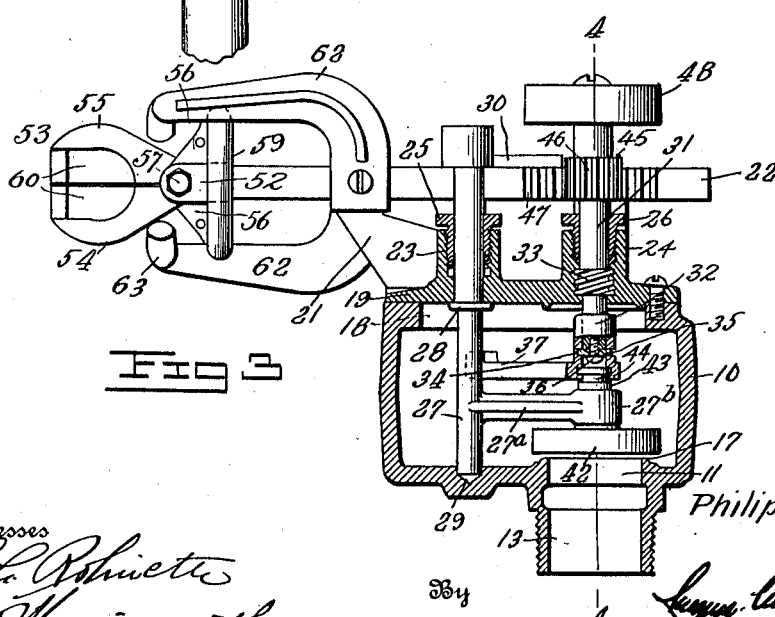
Inventor
Philip Mueller
Witnesses
By
Attorney P. MUELLER.
AUTOMATIC FIRE HOSE VALVE.
APPLICATION FILED NOV. 18, 1911.
1,026,994.
Patented May 21, 1912.
2 SHEETS—SHEET 2.
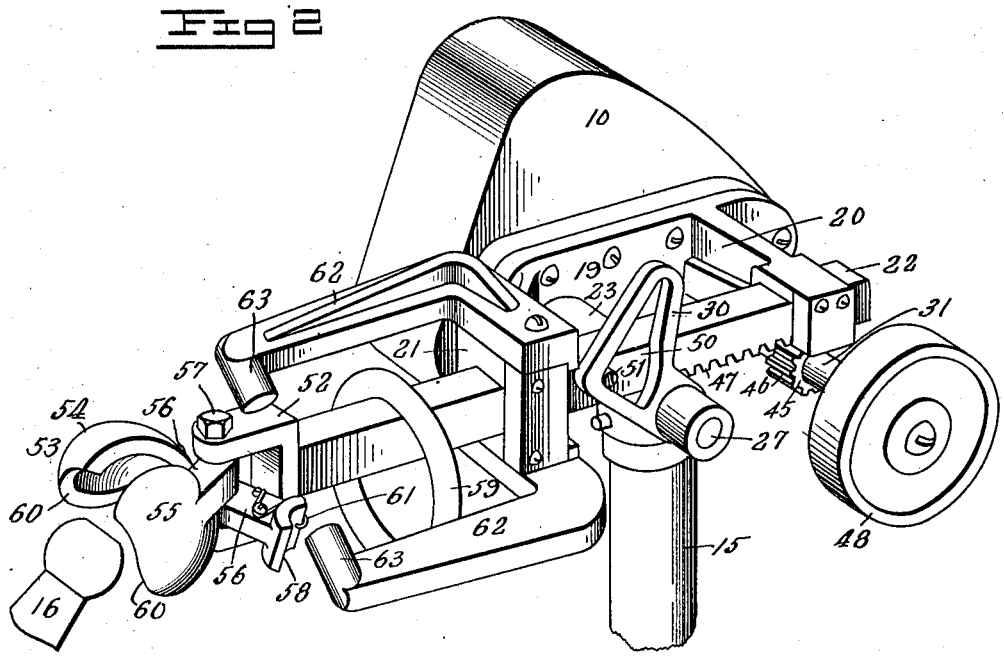
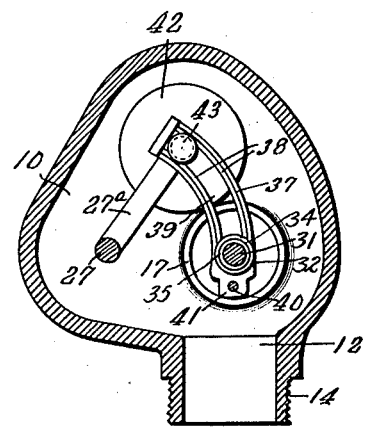
Inventor
Philip Mueller

UNITED STATES PATENT OFFICE.

PHILIP MUELLER, OF DECATUR, ILLINOIS, ASSIGNOR TO H. MUELLER MANUFACTURING COMPANY, OF DECATUR, ILLINOIS, A CORPORATION OF ILLINOIS.

AUTOMATIC FIRE-HOSE VALVE.

1,026,994.      Specification of Letters Patent.      Patented May 21, 1912.

Application filed November 18, 1911. Serial No. 661,106.

*To all whom it may concern:*

Be it known that I, PHILIP MUELLER, a citizen of the United States, residing at Decatur, in the county of Macon, and State of Illinois, have invented new and useful Improvements in Automatic Fire-Hose Valves, of which the following is a specification.

This invention relates to an automatic fire hose valve for use in and about buildings, to the casing of which valve a length of hose is substantially permanently attached, the nozzle of which hose is secured to a sliding valve operating device which when drawn outwardly to disengage the said nozzle simultaneously and automatically operates the valve to admit water to the hose.

In prior constructions so far as known, valves are opened by various means having handles or other devices which must be turned or rotated to operate the valves, and which are liable to corrode or be unduly tightened after closing the valve, thereby causing serious delay before the valve can be opened. In other cases the valve opening means are not sufficiently prominent or they may require more or less manipulation before the desired object can be accomplished, while in still other devices the entire length of hose must be unreeled before opening the valve. These difficulties are overcome in the present invention by a simple mechanism for controlling the opening and closing movement of the valve, actuated by a longitudinally movable bar or member, on one end of which the hose nozzle is fastened and can be released only when said member is drawn longitudinally to its full limit. Before the member reaches its full limit, however, the valve is automatically unseated and moved laterally away from the inlet leaving it wholly unobstructed for passage of water. After this movement of the valve the nozzle holding or gripping means is automatically disconnected and the nozzle falls therefrom or may be withdrawn by the hand.

The objects of the invention, therefore, are to provide an automatic fire hose valve which will carry a full supply of water without unreeling the hose as soon as the hose nozzle is removed from its support; to provide a valve which will open automatically by drawing the hose nozzle and its support in a straight line, which operation first unsets the valve and then moves laterally away from the inlet so that the entering water may have an unobstructed passage, the hose nozzle being then automatically released from its holder at about the time the stream of water reaches it through the hose; and to provide automatic means for opening and closing the valve inlet by the longitudinal movement of a single member provided with means for attaching the hose nozzle thereto.

With these and other objects in view, the invention consists of the novel construction, combination, and arrangement of parts hereinafter described and pointed out in the appended claims, reference being had to the accompanying drawings, in which.

Figure 1 is a perspective view of the improved device when not in use. Fig. 2 is a similar view with the parts in operative position, the hose nozzle being shown released from its holder. Fig. 3 is a view in elevation of the operative parts, the casing containing the valve and its closely related parts being shown in section. Fig. 4 is a sectional view on the line 4—4 of Fig. 3. Fig. 5 is a sectional view on the line 5—5 of Fig. 4. Fig. 6 is an enlarged sectional view of certain parts of the valve operating mechanism. Fig. 7 is a detail view of the pinion showing a flattened portion on its periphery.

In the drawings, wherein similar reference characters are used to designate the same parts in all the figures, 10 indicates a valve chamber made of such a size and shape as will best serve the purpose for which it is to be used, the said chamber having an inlet opening 11 and an outlet opening 12, said openings being provided with pipe couplings 13 and 14 respectively of any suitable type. The inlet coupling 13 is designed to be connected to a standpipe or other means through which water may be conveyed to the desired part of a building, while the coupling 14 has a hose 15 screwed thereon and provided with a nozzle 16. Within the casing 10 and surrounding the inlet opening 11 is a valve seat 17, opposite which is an elongated opening 18 formed in the side of the casing, and normally closed by a head 19 screwed or bolted to the casing, and if desired provided with a packing between said parts.

Projecting outwardly from the head 19 are two brackets 20 and 21 provided with bearings to receive a bar 22 adapted to slide longitudinally therein. Also forming a part of the head 19 on its exterior side are two bosses 23 and 24, socketed from their outer ends to receive nuts 25 and 26, thus forming stuffing boxes when suitably packed to prevent the escape of water therethrough.

Through the boss 23 extends a rock shaft 27 provided intermediate its ends with a collar 28 that bears against the inner side of the head 19 to prevent outward movement of the shaft, the inner end of which is pivoted in a depression 29 in the casing. The outer end of the rock shaft has keyed or pinned thereon a cam 30 for rocking said shaft by means hereinafter described. Within the casing 10 the rock shaft 27 carries a radial arm 27$^a$ on the end of which is a bearing 27$^b$, the object of which will be described later. The second shaft 31, the axis of which is coincident with the axis of the inlet 11, passes through the boss 24 into the casing 10 and carries on its inner end a loose sleeve 32. A screw thread 33 is formed on the shaft 31 and engages a thread in the head 19 so that when the said shaft is rotated the thread will cause it to move in a longitudinal direction. The sleeve 32 which is loosely mounted on the end of the shaft 31 may be retained thereon by various devices, one of which, shown in Fig. 6, has a groove 34 cut in the bore of the sleeve of greater diameter than the shaft, and a washer 35 is fitted in said groove through a slot opening outwardly. The washer bears against the end of the shaft, and is fastened thereto by means of a screw 36. This connection permits the shaft to rotate freely within the sleeve without its turning, but compels the sleeve to partake of the longitudinal movement of the shaft. Fixed on or integral with the sleeve 32 is a skeleton guide 37 concentric with the rock shaft 27, and having inwardly projecting flanges 38 on opposite sides of a slot 39 formed in said guide, and also concentric to the rock shaft. The sleeve and guide are prevented from rotating or turning with the shaft 31 by means of a pin 40 screwed into the head 19 and passing loosely through a hole in a projection 41 on the underside of the sleeve.

Within the casing 10 is the valve disk 42 normally held with suitable force against the valve seat 17. Projecting from the center of the valve on its inner side is a valve stem 43 supported in the bearing 27$^b$ at the end of the arm 27$^a$ projecting from the rock shaft 27, as previously described. The valve stem 43, which can rotate and move longitudinally in the bearing 27$^b$, is in sliding engagement with the curved guide 37, the flanges 38 on said guide entering a a groove 44 formed in said valve stem near its end.

Assuming the valve to be closed on its seat, the axis of the valve will then be in line with the axis of the shaft 31, if the wheel handle 48 of the shaft 31 be now turned in the proper direction, the screw threads 33 on said shaft will cause it to move outwardly a short distance in an axial line, drawing the sleeve 32 and guide 37 with it, because of the swiveled connection between the parts. The valve 42 through engagement of its stem with the said guide will also move axially with the shaft, and be thus unseated, as represented in Figs. 3 and 4. After unseating the valve the rock shaft 27 is turned, thereby swinging the valve transversely out of line with the inlet so as to provide an unobstructed passage for incoming water. The engagement of the groove in the valve stem with the curved guide holds the valve in its withdrawn position as it swings away from and back to the valve seat. A reverse operation of the rock shaft carries the valve into line with the shaft 31, which when rotated in the opposite direction moves inwardly, carrying with it the sleeve and guide, and through the latter pushes the valve to its seat and presses it thereon with sufficient force to prevent leakage.

The movement of the shaft 31 and the rock shaft 27 in proper sequence may be accomplished in numerous ways. One such way is shown in the drawings. Here it will be seen that the bar 22 slidable in the bearings supported on the brackets 20 and 21 is placed at one side of the shaft 31, whereon is fastened a disk 45 having gear teeth 46 around a portion of its periphery. These teeth mesh with a required number of complemental teeth 47 on the adjacent side of the bar 22, so that as the bar is moved the shaft 31 is turned. The outer end of the shaft is provided with a handle 48 for manually moving the valve to and from its seat when so desired. At one end of the toothed section the disk 45 is flattened, as at 49, so that after the teeth on the bar and disk become disengaged this flattened portion will ride against a smooth surface on the bar and prevent the disk and shaft from rotating.

The cam 30 on the outer end of the rock shaft 27 is in the present instance a triangular frame having an opening 50 therein, the walls of which opening are of such length and shape, and so angularly disposed as to turn the rock shaft at the proper time and through an arc of such length as is necessary for transverse movement of the valve. Movement is given to the cam 30 by means of a pin 51 projecting from the bar 22 into the cam 30. The relation between the teeth on the bar, by which the shaft 31 is actuated, and the pin 51 operating the cam is such that rotary movement of the shaft will be accomplished before the pin 51 begins to operate on the cam, when the bar is being drawn outwardly to open the valve, but on the return movement of the bar to close the valve the pin 51 engages the cam and begins to swing the valve toward its seat, but when the same has fully reached its position above said seat, the teeth on the bar engage the toothed disk on the shaft 31, thereby rotating the shaft and forcing the disk toward its seat. From this it will be seen that in opening the valve the latter is first moved axially and then transversely, while in closing the valve there is a period at the beginning of the operation when the valve swings transversely until the valve is over the seat, and finally axially to seat the same, which seating of the valve locks the valve completely.

The forward end of the bar 22 is formed with a yoke shaped head 52 between the arms of which is pivoted a gripper 53 for the head of the nozzle 16. This gripper is formed of two hollow hemispherical jaws 54 and 55, from each of which there projects rearwardly a finger 56, which cross, and are pivotally connected to the head 52 by a bolt 57. The fingers 56 extend beyond their pivotal points for a suitable distance, and have their ends terminating in seats provided for a ring 59, which when in place in said seats holds the jaws 54 and 55 closed on the hose nozzle 16 (see Fig. 1). The jaws 54 and 55 each have a cutaway portion 60 to permit the hose nozzle when gripped to swing through an arc of about 90° so that it may be brought into line with the bar 22 from any angular position which it may assume when not in use. When the jaws are closed on the hose nozzle the seats 58 on the arms 56 are brought sufficiently near each other to permit the ring 59 being slipped over them and retained on the seats by means of spring 61, which are depressed when the ring is positioned on the seats, and immediately spring up behind said ring and offer sufficient resistance to retain it in place until forced off by means now to be described.

Screwed or bolted on the opposite sides of the bracket 21 are arms 62 which extend forwardly for a sufficient distance and terminate each with an inwardly projecting stud 63 extending toward each other for a short distance, the object of which studs is to remove the ring from the seats 58 and permit the jaws to open.

Normally, or when the valve is not in use, the several parts will be in the position shown in Fig. 1, the hose 15 being reeled or folded and properly supported in a manner well known, and the nozzle 16 of the hose will be gripped by the jaws 54 and 55. The bar 22 will be in its retracted position and the valve 42 closed. If now it becomes necessary to use the hose the nozzle is grasped and swung upwardly on a line with the bar 22 and drawn outwardly to the position shown in Fig. 2. This movement first operates the shaft 31 to withdraw the valve from its seat and afterward motion is given to the rock shaft 27 to swing said valve laterally out of line with the inlet opening 11. Just as the pin 51 is about to move the cam 30 on the rock shaft 27, the teeth on the bar 22 will have become disengaged from the toothed disk on the shaft 31, and the bar will then slide over the flattened surface on said disk, thus locking the latter against rotation. At about the time the valve 42 reaches the limit of its movement, the ring 59 which locks the jaws 54 and 55 closed on the hose nozzle will strike the studs 63 on the arms 62 with sufficient force to disengage said ring from the seats 58 on the arms 56 of said jaws. Being thus released the jaws will swing open under the pressure of the nozzle 16 and permit the latter to be withdrawn therefrom. After using the hose sufficiently, and it is desired to cut off the water, the bar 22 may be pushed rearwardly to operate the rock shaft 27 and shaft 31, and thus close the valve 42 on its seat 17. The hose nozzle may be clamped between the jaws 54 and 55 and locked therein by the ring 59 before the valve is closed or this may be done afterward.

Having thus described the invention what I claim as new is:—

1. In a device of the character described, a valve casing having inlet and outlet openings, and a valve seat around the inlet, a valve adapted to be moved laterally out of line with said seat, a longitudinally movable member, mechanism actuated by said member to operate said valve, means on said movable member for gripping a hose nozzle, and means for disengaging said gripping means from the nozzle after the member has moved sufficiently far to fully open said valve.

2. In a device of the character described, a valve casing having inlet and outlet pipe connections and a valve seat encircling the inlet connection, a valve adapted to close said inlet, means for moving the valve axially of its seat, separate means for moving the valve transversely of its seat, a longitudinally movable member adapted to actuate both of said instrumentalities, means on one end of said movable member for gripping the nozzle of the hose attached at its other end to the outlet pipe connection, and means for automatically disengaging said nozzle from the gripping means when the aforesaid member has reached the end of its movement and after the inlet has been uncovered.

3. In a device of the character described, a valve casing having inlet and outlet pipe connections and a valve seat encircling the inlet connection, a valve adapted to close said inlet, a shaft extending into said casing in axial line with the inlet and adapted to rotate and move longitudinally, connecting means between said shaft and valve whereby said valve partakes of the longitudinal movement of the shaft, a rock shaft also extending into the casing, means on said rock shaft for supporting the valve and permitting it to move to and from its seat, said means also carrying said valve transversely of its seat when the rock shaft is operated, and means for turning both shafts.

4. In a device of the character described, a valve casing having inlet and outlet pipe connections and a valve seat encirling the inlet connection, a valve adapted to close said inlet, a grooved stem on said valve, a shaft extending into said casing in axial line with the inlet and adapted to rotate and move longitudinally, a non-rotatable sleeve on the inner end of said shaft carrying a guide in engagement with the groove in the valve stem and adapted to move longitudinally with the shaft, a rock shaft also extending into the casing, means on said rock shaft in which the valve stem is slidably mounted and by which the valve is transversely moved beyond its seat when the rock shaft is operated, and means for successively turning said shafts.

5. In a device of the character described, a valve casing having inlet and outlet pipe connections, and a valve seat encircling the inlet connection, a valve adapted to close said inlet, a shaft extending into said casing in axial line with the inlet and adapted to rotate, means on said shaft for moving it longitudinally as it rotates, a non-rotatable sleeve on the inner end of said shaft carrying a curved guide in engagement with the groove in said valve stem and adapted to move longitudinally with the shaft, a rock shaft also extending into the casing, an arm on said rock shaft in which the valve stem is slidably mounted and by which the valve is transversely moved beyond its seat when the rock shaft is operated, and means for successively turning the shafts.

6. In a device of the character described, a valve casing having inlet and outlet pipe connections, and a valve seat encircling the inlet connection, a valve adapted to close said inlet, a shaft extending into said casing in axial line with the inlet and adapted to rotate, means on said shaft for moving it longitudinally as it rotates, a non-rotatable sleeve on the inner end of said shaft carrying a curved guide in engagement with the groove in said valve stem and adapted to move longitudinally with the shaft, a rock shaft also extending into the casing, an arm on said rock shaft in which the valve stem is slidably mounted and by which the valve is transversely moved beyond its seat when the rock shaft is operated, rotatable means on the first named shaft exterior of said casing, a cam fixed on the exterior end of the rock shaft, and a longitudinally movable member bearing separate means for rotating said first named shaft and operating the cam on the rock shaft.

7. In a device of the character described, a valve seat and a valve therefor, a longitudinally movable member, mechanism actuated by said member to move the valve laterally from its seat, means on the movable member for gripping a hose nozzle, and means for automatically disengaging the hose nozzle from the gripping means after the valve has been unseated.

8. In a device of the character described, a valve seat and a valve therefor, a longitudinally movable member, mechanism actuated by said member to move the valve axially and laterally from its seat, means on the movable member for gripping a hose nozzle, and means for automatically disengaging the hose nozzle from the gripping means after the valve has been unseated.

9. In a device of the character described, a valve seat and a valve therefor, a longitudinally movable bar, mechanism intermediate the bar and the valve operated by the longitudinal movement of said bar, and causing said valve to move in an axial line and transversely to said line to seat and unseat said valve.

10. In a device of the character described, a valve seat and a valve therefor, a stem on which the valve is mounted, mechanism coöperating with the stem for seating and unseating the valve by axially moving said stem, and separate mechanism for moving the valve transversely from and toward its seat, and means for operating said mechanisms.

11. In a device of the character described, a valve seat and a valve therefor, a stem on which the valve is mounted, mechanism coöperating with the stem for seating and unseating the valve by axially moving the stem, and separate mechanism for moving the valve transversely from and toward its seat, and means for successively operating said mechanisms.

12. In a device of the character described, a valve seat and a valve therefor, mechanism for seating and unseating the valve by axially moving said valve, and separate mechanism for moving the valve transversely from and toward its seat, and means for successively operating said mechanisms to first unseat said valve and then to move the same transversely when opening the valve and when closing the same to simultaneously operate both mechanisms.

13. In a device of the character described, a casing having inlet and outlet openings, a valve for said inlet opening, a hose connection for the inlet opening, means for carrying said valve laterally beyond the inlet opening, a longitudinally movable member for actuating said valve operating means, gripping means for a hose nozzle comprising a plurality of jaws, an arm on each jaw intermediately pivoted to one end of said longitudinal movable member and having seats on their free ends, removable locking means supported in said seats for holding said jaws closed on the nozzle, and stops for removing said locking means and freeing the jaws and nozzle after the valve has been fully opened.

14. In a device of the character described, a valve casing having inlet and outlet pipe connections and a valve seat encircling said inlet connection, a valve adapted to close said inlet, a shaft extending into said casing and adapted to rotate and move longitudinally, means between said shaft and the valve for lifting the valve axially from its seat, a rock shaft also extending into the casing, means on said rock shaft for moving the valve transversely of its seat, a longitudinally movable member for actuating said valve operating shafts, gripping means for a hose nozzle comprising a plurality of jaws, an arm on each jaw intermediately pivoted to one end of said longitudinally movable member and having seats on their free ends, removable locking means supported in said seats for holding the jaws closed on the nozzle, and stops for removing said locking means and freeing the jaws and nozzle after the valve has been fully opened.

15. In a device of the character described, a casing provided with inlet and outlet openings, a valve for the inlet opening, a longitudinally movable member, gripping means on said member for gripping the nozzle of a hose connected to the outlet opening of the casing, means actuated by the longitudinally movable member for opening the valve, and means for disengaging the nozzle gripping means after the valve has been opened, both of said operations being performed by the movement of said member in one direction.

16. In a device of the character described, a valve casing having inlet and outlet openings, and a valve seat around one of said openings, a valve adapted to be moved out of line with said seat, a movable member, mechanism actuated by said member to operate said valve, means on said movable member for gripping the hose nozzle, and means for disengaging said gripping means from the nozzle after the member is moved sufficiently far to open said valve.

In testimony whereof I have hereunto set my hand in presence of two subscribing witnesses.

PHILIP MUELLER.

Witnesses:
 WILLIAM R. BIDDLE,
 CATHERINE E. MCKEOWN.

Copies of this patent may be obtained for five cents each, by addressing the "Commissioner of Patents, Washington, D. C."